Feb. 3, 1925.
1,525,044
J. W. PRIMROSE
EYESHIELD ATTACHMENT FOR MOTOR VEHICLES
Filed Jan. 15, 1924
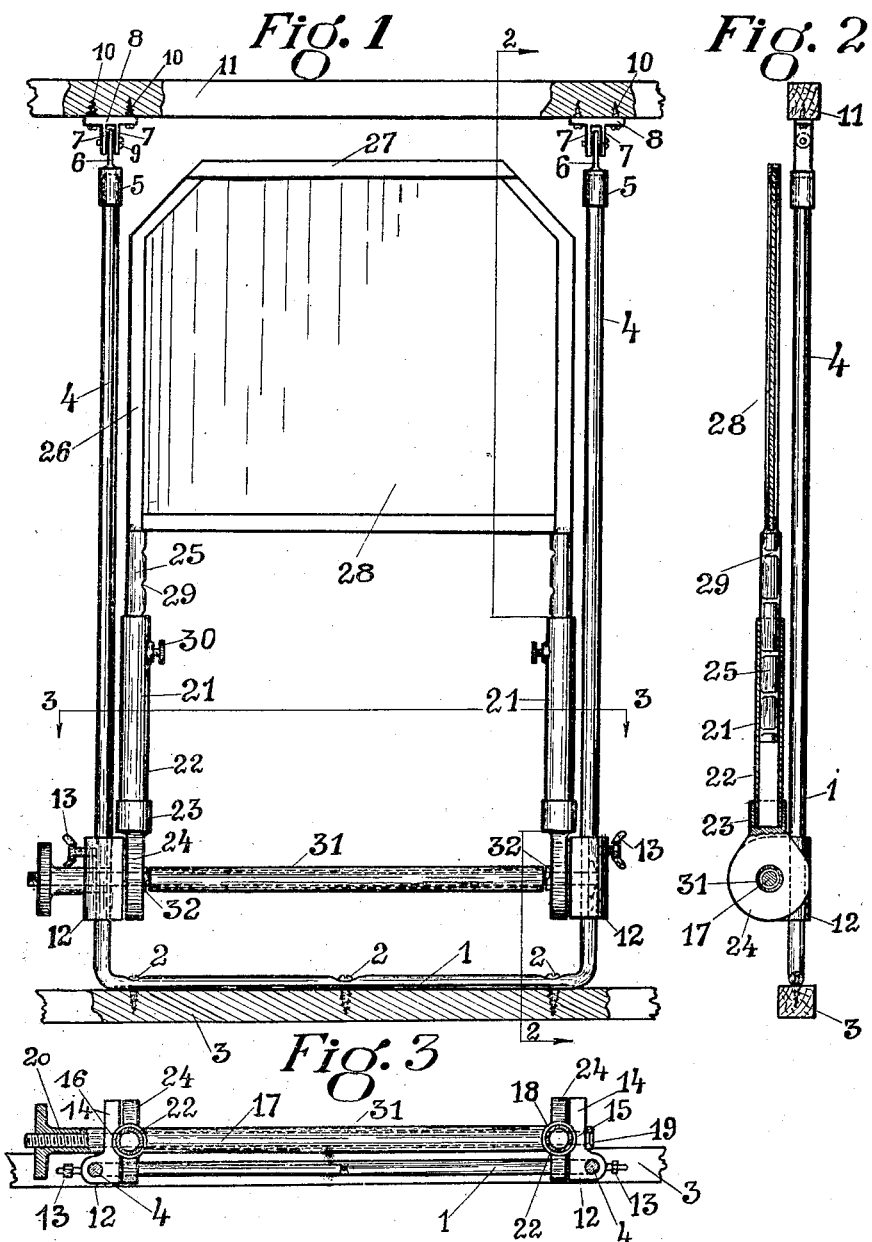
WITNESSES
INVENTOR
John W. Primrose
BY
ATTORNEYS Patented Feb. 3, 1925.

1,525,044

UNITED STATES PATENT OFFICE.

JOHN WILLIAM PRIMROSE, OF CLARKSDALE, MISSISSIPPI.

EYESHIELD ATTACHMENT FOR MOTOR VEHICLES.

Application filed January 15, 1924. Serial No. 686,369.

*To all whom it may concern:*

Be it known that I, JOHN W. PRIMROSE, a citizen of the United States, and resident of Clarksdale, in the county of Coahoma and State of Mississippi, have invented certain new and useful Improvements in Eyeshield Attachments for Motor Vehicles, of which the following is a specification.

My invention relates to improvements in eye-shield attachments for motor vehicles, and it consists of the constructions and arrangements herein described and claimed.

The present invention contemplates the provision of an eye shield attachment for motor vehicles which in general falls within the scope of the same broad invention as that which is disclosed in Letters Patent of the United States #1,461,289, granted to me July 10, 1923, but which embodies novel features of construction which are not disclosed in the aforesaid Letters Patent.

An object of the present invention is to provide an attachment of the character described which affords facilities for supporting an eye shield on members of the top supporting frame of a motor vehicle so that both the angular relation of the eye shield to the line of vision of the operator of the motor vehicle and the position of the eye shield in respect to the operator of the motor vehicle may be varied at will within a considerable range.

A further object of the invention is to provide an attachment of the character described which is adapted to be attached to spaced apart supporting members lying in the same or different horizontal planes.

A still further object of the invention is to provide an attachment of the character described which has means for holding the eye shield in adjusted position securely, although releasably.

Other objects and advantages of the invention will be apparent from the following description, considered in conjunction with the accompanying drawings, in which—

Figure 1 is a plan view showing the attachment secured to two spaced apart transverse supporting members, portions of the latter being broken away, Figure 2 is a longitudinal vertical section substantially along the line 2—2 of Figure 1, and Figure 3 is a transverse vertical section substantially along the line 3—3 of Figure 1.

An attachment embodying the present invention comprises a substantially U-shaped attaching and supporting frame 1 having the web portion thereof provided with a series of spaced apart openings for receiving screws 2 whereby the web portion may be secured to a fixed supporting member 3 which in actual practice usually is one of the transverse bows of the frame of a motor vehicle top. The openings through the web portion of the member 1 preferably lie in the plane of the member 1 so that the web portion may be clamped against the side of the support 3 and the arm of the U-shaped member 1 will extend substantially at right angles to the support 3.

The arms of the U-shaped member 1 are designated 4 and each of these arms has the outer end portion thereof received in a close fitting cap 5. The latter has a flat axial extension or lug 6 adapted to be received between spaced apart ears 7 of a bracket 8. A pivot member which preferably is a screw 9 extends through aligned openings in the parts 7—6—7 whereby the cap 5 and consequently one of the arms of the U-shaped member may be connected with one of the brackets 8. Each bracket 8 has an attaching plate portion provided with openings for receiving screws 10 or like devices for securing the bracket to a supporting member such as that indicated at 11. It will be obvious that the attaching plate portion of each bracket may be disposed in planes extending at various angles to the longitudinal axis of the U-shaped member 1 so that the bracket 8 may be attached to a supporting member 11 which lies in the same or a different plane from that of the supporting member 3.

Each of the arms 4 carries a sliding block 12 which may be secured in an adjusted position along the arm by a set screw 13, the latter preferably being provided with a winged head as shown. Each of the blocks 12 has a flat pendant portion 14 provided with a transverse opening, the opening through one of the pendant portions being non-circular in configuration and being designated 15 while the transverse opening in the other pendant portion is circular in cross sectional contour and is indicated at 16.

A rod 17 which extends transversely of the U-shaped member 1 has a non-circular end portion extending through the transverse opening 15 and provided at its extremity with a retaining element 19. The rod 17 extends through the opening 16 and the extending portion thereof is screw threaded for engaging with a clamping nut 20.

A pair of arms 21 are swingingly supported at their upper ends on the rod 17. Each of the arms 21 comprises a tubular section 22, a cap 23 which is secured on the tubular section at the upper end of the latter and has an axial extension or lug 24 provided with a transverse opening through which the rod 17 extends, and a third section 25 which slidably interfits the tubular section 22 and is an extension of one of a pair of parallel side members 26 of a frame indicated generally at 27 which holds an eye shield 28. The latter preferably consists of a pane of colored glass.

The section 25 of the arm 21 is provided with a series of spaced apart notches 29, each of which is adapted to be engaged by a set screw 30 carried by the tubular section 22 so that the section 25 may be secured to the tubular section 22 in any one of a plurality of adjustments and the effective length of the supporting arms 21 therefore may be varied within a considerable range.

A tubular spacer 31 is disposed on the rod 17 between the lugs 24 of the two swinging arms, spring lock washers 32 being disposed on the rod 17 between the opposite ends of the spacer 31 and the adjacent lugs 24.

When the shield 28 lies in a plane extending at a desirable angle to the line of the U-shaped supporting member 1, the clamping nut 20 is tightened until the lugs 24 are clamped between the lock washers 32 and the pendant portions 14 of the block 12 and thus are locked to the rod 17. The engagement of the non-circular portion 18 of the rod 17 with the non-circular transverse opening through one of the pendant portions 14 of course will prevent rotation of the rod 17 in the transverse openings of the blocks 12.

From the foregoing description of the various parts of the device, the operation thereof may be readily understood. In actual practice, the supporting member 11 is the front transverse member of the supporting frame of the top of a motor vehicle. The blocks 12 may be slid along the arms 4 to any desired position and secured in adjusted position along the arms. The nuts 20 may then be loosened and the arms 21 swung until the shield 28 occupies a desirable position, either being in an upwardly swung and out of the way position as illustrated in the drawings or in any one of various angular relations to the line of vision of the operator of the motor vehicle. The shield 28 will be firmly although releasably held in adjusted position when the nut 20 has been tightened to prevent further swinging movement of the arms 21.

Obviously, my invention is susceptible of embodiment in forms other than that illustrated in the accompanying drawing and I therefore consider as my own all modifications and adaptations of the form of the invention herein described as fairly fall within the scope of the appended claims.

Having thus described the invention, what I claim is:—

1. An attachment of the character described comprising a substantially U-shaped supporting member having the web portion thereof adapted for attachment to a fixed support, caps receiving the end portions of the arms of said U-shaped member, each cap having an axially extending lug, a bracket for each arm, each bracket being attachable to a fixed support and having a pair of spaced apart ears between which the lug on one of said caps may be received, pivot members connecting the associated lugs and pairs of ears together, said pivot elements being in axial alignment with each other, a glare shield, and means whereby said glare shield is swingingly supported on said arms.

2. An attachment of the character described comprising a substantially U-shaped supporting member having the web portion thereof adapted for attachment to a fixed support, caps receiving the end portions of the arms of said U-shaped member, each cap having an axially extending lug, a bracket for each arm, each bracket being attachable to a fixed support and having a pair of spaced apart ears between which the lug on one of said caps may be received, pivot members connecting the associated lug and ears together, a glare shield, means whereby said glare shield is swingingly supported on said arms, and is mounted for bodily movement in the direction of length of said arms.

3. In an attachment of the character described, a substantially U-shaped supporting frame attachable to spaced apart supporting members and having parallel arms, a pair of blocks respectively slidable on said arms and adapted to be secured in adjusted position along the latter, said blocks having aligned transverse openings, a rod extending through the transverse openings of the frame and supported in said openings of the blocks, said rod being held against rotation in said openings, a pair of swinging arms carried by said rod, and a glare shield supported by said swinging arms at the lower end of the latter.

4. In an attachment of the character described, a substantially U-shaped supporting frame attachable to spaced apart supporting members and having parallel arms, a pair of blocks respectively slidable on said arms and adapted to be secured in adjusted position along the latter, said blocks having aligned transverse openings, a rod extending through the transverse openings of the frame and supported in said openings of the blocks, said rod being held against rotation in said openings, a pair of swinging arms carried by said rod, a glare shield supported by said swinging arms at the lower end of the latter, and clamping means on said rod for locking said swinging arms to said rod, said swinging arms being adjustable as to length.

5. In an attachment of the character described, a supporting frame having parallel arms, a pair of blocks respectively slidable on said arms and adapted to be secured in adjusted position along the latter, said blocks having aligned transverse openings, a rod extending between said blocks and supported in said openings of the blocks, a pair of swinging arms carried by said rods, and a glare shield supported by said swinging arms at the lower ends of the latter.

JOHN WILLIAM PRIMROSE.